United States Patent
Rountree et al.

(10) Patent No.: US 7,416,332 B2
(45) Date of Patent: Aug. 26, 2008

(54) FLEXIBLE CIRCUIT TEMPERATURE SENSOR ASSEMBLY FOR FLANGED MOUNTED ELECTRONIC DEVICES

(75) Inventors: Timothy D. Rountree, Rochester, NY (US); Thomas D. O'Brien, Honeoye Falls, NY (US); Kenneth Beghini, Spencerport, NY (US)

(73) Assignee: Harris Corporation, Melbourne, FL (US)

( * ) Notice: Subject to any disclaimer, the term of this patent is extended or adjusted under 35 U.S.C. 154(b) by 70 days.

(21) Appl. No.: 11/391,826

(22) Filed: Mar. 29, 2006

(65) Prior Publication Data

US 2007/0248142 A1  Oct. 25, 2007

(51) Int. Cl.
   G01K 1/08   (2006.01)
   G01K 1/14   (2006.01)

(52) U.S. Cl. .................. 374/152; 374/153; 374/208; 374/E1.018; 374/E1.019; 374/E1.021; 257/731; 257/732; 257/733; 257/180

(58) Field of Classification Search ......... 374/208–210, 374/163, 179, 120, 121, 132, 152, 153, 170, 374/183, 185, E7.018, E13.008, E1.018, 374/E1.019; 338/13–47; 322/33; 377/25; 257/731–733, 180
See application file for complete search history.

(56) References Cited

U.S. PATENT DOCUMENTS

| | | | |
|---|---|---|---|
| 2,854,610 A * | 9/1958 | Waters et al. ................ 257/694 |
| 3,779,079 A * | 12/1973 | Snook ......................... 374/165 |
| 4,117,257 A * | 9/1978 | Thomas ....................... 174/535 |
| 4,990,987 A * | 2/1991 | Boucher et al. ............. 257/467 |
| 5,149,200 A * | 9/1992 | Shiokawa et al. ........... 374/185 |
| 5,213,417 A * | 5/1993 | Yamada et al. .............. 374/183 |
| 5,291,063 A * | 3/1994 | Adishian ..................... 257/712 |
| 5,449,234 A * | 9/1995 | Gipp et al. .................. 374/185 |
| 5,918,292 A * | 6/1999 | Smith ......................... 73/866.5 |
| 6,107,669 A * | 8/2000 | Mokuya et al. ............. 257/467 |

(Continued)

FOREIGN PATENT DOCUMENTS

JP   60116154 A  *  6/1985

OTHER PUBLICATIONS

United Electric (UE) Online—Temperature sensors (2001) http://web.archive.org/web/20011214123047/http://www.ueonline.com/products/fp_tempsensors.htm.*

*Primary Examiner*—Edward Lefkowitz
*Assistant Examiner*—Bret Adams
(74) *Attorney, Agent, or Firm*—Darby & Darby; Robert J. Sacco

(57) ABSTRACT

A temperature sensing system for a flange mounted device is provided. The temperature sensing system (100) can be comprised of a flexible wiring board (102). The temperature sensing system can be further comprised of a temperature sensing device (122) mounted to the flexible wiring board. The flexible wiring board can have one or more conductive traces (114a, 114b, 114c) disposed thereon. The conductive traces can form an electrical connection with the temperature sensing device. The temperature sensing system can also comprise a thermal pad directly connected to the temperature sensing device. The thermal pad can be formed of a thermal conductor. The thermal pad can also have a thermal contact surface. The thermal contact surface can be sized and shaped for direct physical contact with a portion of the device (302), wherein thermal energy is communicated directly from the thermal pad to the temperature sensing device. A method for sensing a temperature of a flange mounted device is also provided.

10 Claims, 3 Drawing Sheets

U.S. PATENT DOCUMENTS

| | | | |
|---|---|---|---|
| 6,147,868 A * | 11/2000 | Boutillier et al. | 361/707 |
| 6,588,931 B2 | 7/2003 | Betzner et al. | |
| 7,080,941 B1 * | 7/2006 | Benjamin et al. | 374/179 |
| 2002/0071475 A1 * | 6/2002 | Betzner et al. | 374/185 |
| 2004/0086026 A1 * | 5/2004 | Miki et al. | 374/183 |

* cited by examiner

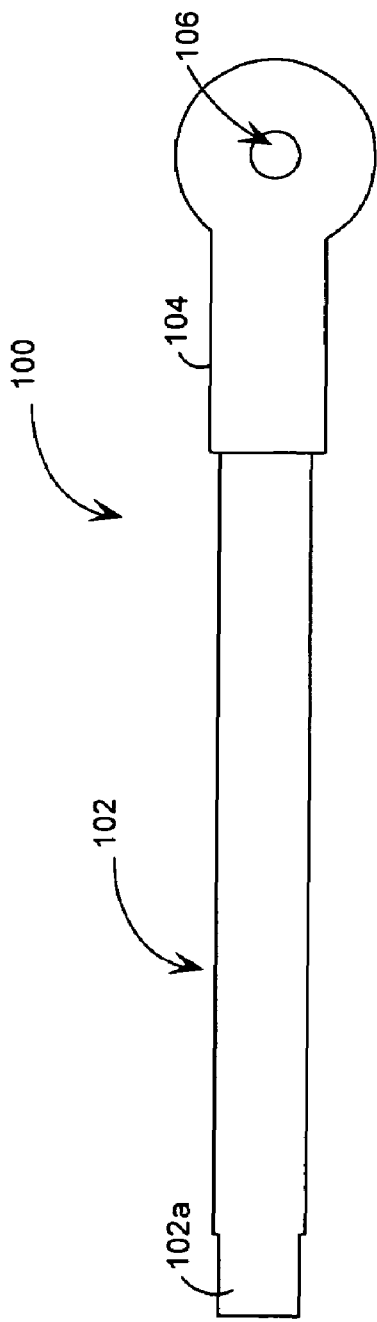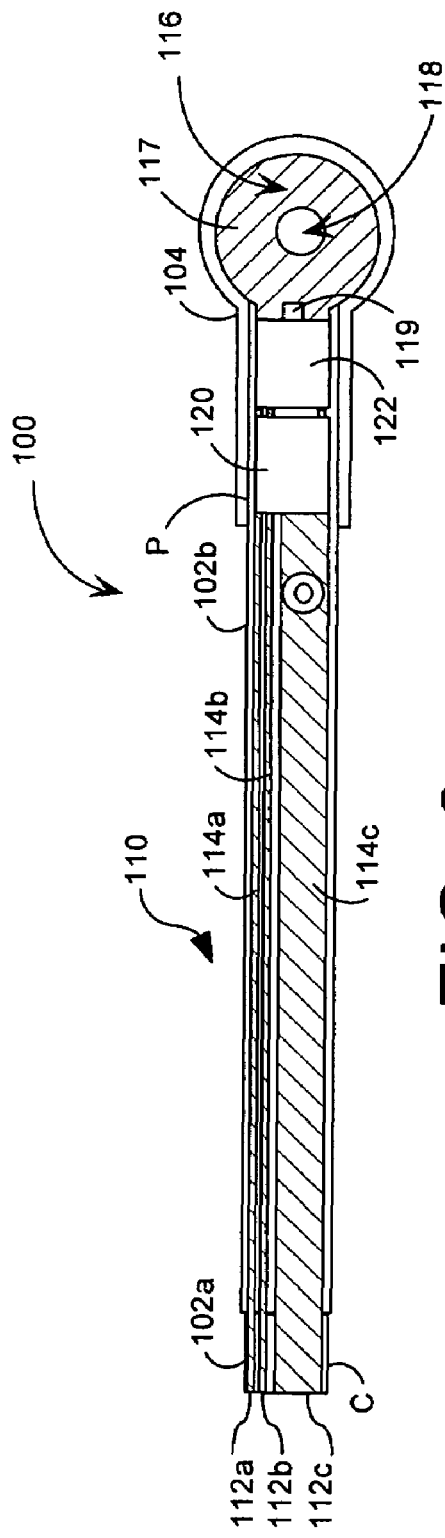
FIG. 1
FIG. 2

FLEXIBLE CIRCUIT TEMPERATURE SENSOR ASSEMBLY FOR FLANGED MOUNTED ELECTRONIC DEVICES

BACKGROUND OF THE INVENTION

1. Statement of the Technical Field

The invention concerns sensor equipment, specifically, flexible circuits wherein the flexible circuit serves as a substrate for a contact temperature sensor.

2. Description of the Related Art

Temperature sensing devices are well known in the art. For example, thermocouples and thermistors have been used for many years to perform temperature sensing functions. Notwithstanding their widespread use, thermocouples and thermistors are known to suffer from certain limitations. For example, thermocouples are non-linear devices that have a low sensitivity to small temperature changes and are relatively inaccurate. Errors of less than ±1.0° C. are difficult to achieve. A thermocouple's life span depends on the operating temperature, the operating environment, the thermocouple wire size, and the thermocouple insulation type. A thermocouple's accuracy also decreases as a function of time. For example, the heating and cooling of thermocouple wires causes physical and chemical changes to the wires, such as metallurgical structure changes and reactions with oxygen. As a result, the thermocouple's accuracy range becomes more inefficient over time. Thermistors tend to be more accurate than thermocouples, but they have a much more limited temperature range because of their marked non-linearity.

In recent years, various manufacturers have developed integrated circuit temperature sensing devices. Such devices offer a number of advantages as compared to temperature sensing systems that are based on conventional thermocouple or thermistor technology. For example, integrated circuit temperature sensors can be designed to produce either voltage or current output. The also produce a very linear output that can simplify system design.

Notwithstanding the advantages of integrated circuit temperature sensors, they can also create some practical design problems. For example, such design problems can occur when a sensing device is used to measure a case surface temperature of an electronic device, such as a flange mounted transistor.

Temperature sensors can come in various packages useful for mounting the sensor device to a printed circuit board (PCB) or a printed wiring board (PWB). PCBs and PWBs are rigid insulated boards on which interconnected circuits and components are mounted. However, such sensor architectures often do not provide suitable mechanisms for transporting thermal energy to the sensor from the heat source in order to take an accurate temperature measurement. Some types of sensors, such as thermocouples are offered in a bolt on configuration that is well suited for attachment to certain electronic devices, such as a flange mounted transistor. Such configurations can offer good thermal performance, but still suffer from all of the various disadvantages commonly associated with thermocouple devices.

Alternative solutions to the temperature sensing problem include arrangements that attach a thermal conductor to the device which is to be measured. The thermal conductor can be connected to one or more other thermally conductive elements, which are ultimately connected to the temperature sensing device. The thermally conductive elements can be used to transport heat energy from the device undergoing measurement, to the temperature sensing device. While such arrangements have been used in the past, they also have some disadvantages.

For example, such arrangements typically comprise a large number of parts. These parts can include one or more metal studs or plates, and electrical wiring for powering the sensor and communicating measured data. If a board mounted integrated circuit temperature measuring device is used, then an auxiliary printed wiring board can also be required to accommodate the integrated circuit package and pin-outs. Due to the large number of components and associated assembly labor, this sensor architecture is very costly to manufacture. In addition, thermal performance in these arrangements can be compromised because of the rather long thermal conduction path. This can lead to inaccurate or delayed sensing of temperature variations occurring on the device to be measured.

Despite the various configurations known in the art there remains a need for a more accurate, real time temperature sensing system having an improved mechanical connection between a sensor and a heat source. A flexible, miniaturized temperature sensing system is also needed that is cost efficient by minimizing assembly labor and part count.

SUMMARY OF THE INVENTION

A temperature sensing system for a flange mounted device is provided. The temperature sensing system can be comprised of a flexible wiring board and a temperature sensing device (e.g., a contact temperature sensor) mounted to the flexible wiring board. One or more conductive traces disposed on the flexible wiring board can be used to form an electrical connection with the temperature sensing device. A thermal pad can be directly connected to the temperature sensing device. The thermal pad can be formed of a thermal conductor and can include a thermal contact surface. According to one aspect of the invention, the thermal contact surface can be sized and shaped for direct physical contact with a portion of a flange mounted device (e.g., a flange mounted transistor). Consequently, thermal energy can be communicated directly from the thermal pad to the temperature sensing device. The thermal pad can also have one or more bores sized and shaped for receiving a portion of a mounting stud of the flange mounted device.

The thermal pad can be disposed on a substrate. The substrate can be formed of a dielectric board material having a greater rigidity as compared to the flexible wiring board. The substrate can have one or more bores sized and shaped for receiving a portion of a mounting stud of the flange mounted device. A portion of the flexible wiring board can be secured to the substrate.

According to another embodiment of the invention, the temperature sensing system can be further comprised of an RF filter circuit which is also disposed on the flexible wiring board. Moreover, the temperature sensing device can be selected to include an integrated circuit temperature sensor. According to another embodiment of the invention, the flexible wiring board can further be comprised of a connector disposed on an end of the flexible wiring board opposed from the temperature sensing device.

A method for sensing a temperature of a flange mounted device is also provided. The method can comprise communicating thermal energy from a flange mounted device to a thermal contact surface of a thermal pad. The method can further comprise sensing a temperature of the flange mounted device using a temperature sensing device mounted to a flexible wiring board and directly connected to the thermal pad.

According to an embodiment of the invention, the method can comprise communicating thermal energy from the flange mounted device to the thermal pad exclusive of any intervening structure. According to another embodiment of the invention, the method can comprise communicating thermal energy from the flange mounted device to the thermal pad exclusively through a mounting stud for the flange mounted device and a spacer element. The space element can be used to offset the thermal pad on the mounting stud from the flange mounted device.

According to another embodiment of the invention, the method can comprise selecting the temperature sensing device to include an integrated circuit temperature sensing device. The method can further comprise filtering an output of the temperature sensing device using a filter circuit disposed on the flexible wiring board. The method can also comprise selecting a size and shape of the thermal pad to permit direct physical contact of the thermal pad with a portion of the flange mounted device.

A sensor assembly is also provided. The sensor assembly can be comprised of a flexible wiring board having a sensor circuit. The sensor circuit can be comprised of one or more traces and one or more pads. The traces can interconnect one or more temperature sensing devices, such as an integrated circuit temperature sensor, with the pads. The sensor assembly can further be comprised of a thermal conductive material having a thermal contact surface and a bore. The thermal conductive material can be affixed to the flexible wiring board such that the thermal conductive material is coupled to the temperature sensing devices. The thermal conductive material can make direct contact with a heat source during operation.

BRIEF DESCRIPTION OF THE DRAWINGS

Embodiments will be described with reference to the following drawing figures, in which like numerals represent like items throughout the figures, and in which:

FIG. 1 is a top view of a temperature sensing system according to an embodiment of the invention.

FIG. 2 is a bottom view of a temperature sensing system according to an embodiment of the invention.

DETAILED DESCRIPTION OF THE PREFERRED EMBODIMENTS

Figure 3:
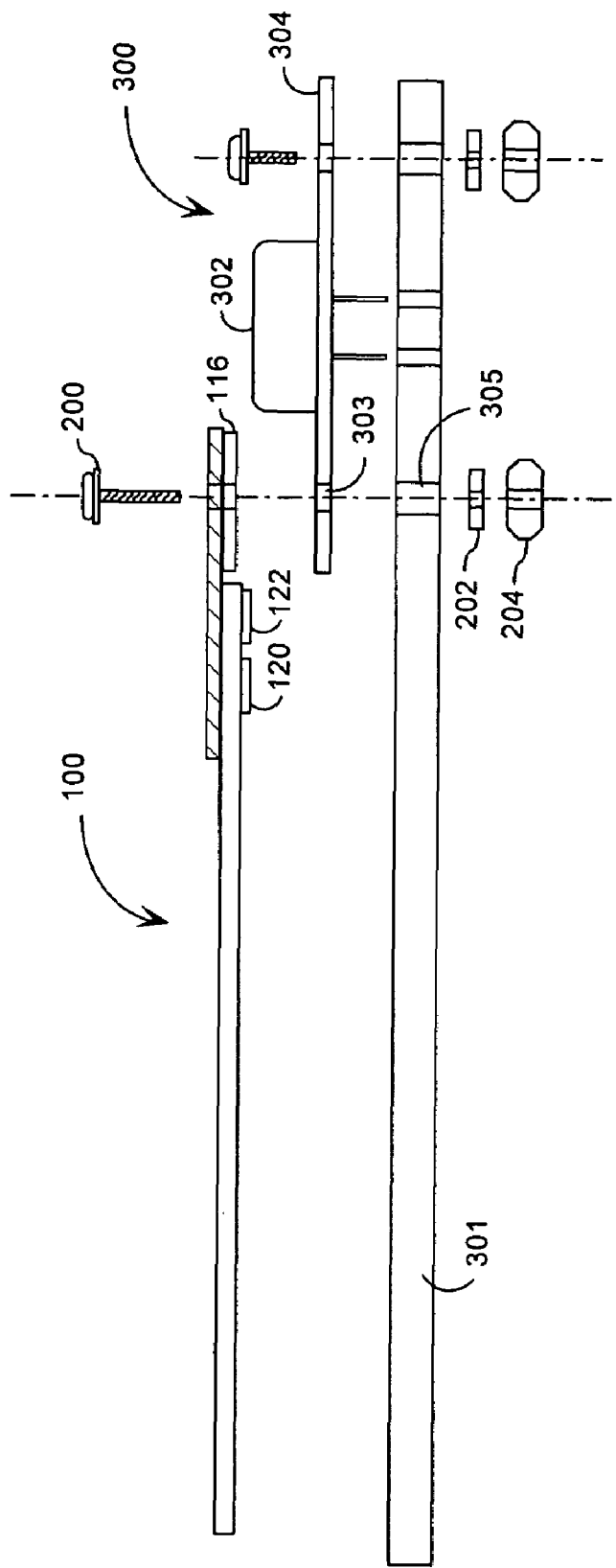
FIG. 3 is an illustration of an architecture for securing a flange mounted device to the temperature sensing system of FIG. 1 and FIG. 2.

Flexible circuits are commonly used in electronic applications requiring flexible, miniaturized circuit designs having an increased functional capacity and improved reliability. Flexible circuits typically comprise flexible wiring boards made of a flexible material, such as a polymer film or a liquid crystal polymer material. Flexible circuits are further comprised of a thin sheet of copper affixed to the flexible material. The flexible material protects the copper from contamination. The thin sheet of copper is often laminated to the flexible material and etched to produce a circuit pattern. The circuit pattern is commonly designed to include one or more conductive traces and one or more conductive pads.

A temperature sensing system can be devised which incorporates flexible circuit technology, such as that described above. The temperature sensing system can provide a configuration with an improved thermal and mechanical connection between a temperature sensing device (e.g., a contact temperature sensor) and a heat source (e.g., a flange mounted transistor). The temperature sensing system can also provide a more accurate, real time temperature measurement system. Such a temperature sensing system is illustrated in FIG. 1-FIG. 2.

FIG. 1 is a top view of a temperature sensing system 100 according to an embodiment of the invention. FIG. 2 is a bottom view of the temperature sensing system 100. The temperature sensing system 100 can include a flexible wiring board 102, on which a sensor circuit 110 can be affixed. The flexible wiring board 102 can be made of a flexible material, such as a polyimide film or a liquid crystal polymer material. The flexible wiring board 102 can further be comprised of a connector portion at an end C and a probe portion at another end P. The connector portion can be designed for insertion into a connector, such as a zero insertion force (ZIF) connector, a thru-hole connector, surface mount connector, or crimped contact and displacement connector.

As shown in FIG. 1 and FIG. 2, the connector portion can be designed to insert into a ZIF connector. Still, a person skilled in the art will appreciate that the invention is not limited in this regard. The connector portion can be designed for insertion into a type of connector selected in accordance with a flexible wiring board application.

The sensor circuit 110 can be comprised of one or more conductive traces 114a, 114b, 114c and one or more conductive pads 112a, 112b, 112c. The traces 114a, 114b, 114c can be made of a flexible conductive material, such as copper, nickel, kovar, or steel. Each trace 114a, 114b, 114c can terminate at the connector portion in the form of a pad 112a, 112b, 112c, respectively. The pads 112a, 112b, 112c can provide a connection means between the sensor circuit 110 and an external system, such as a control system or a power source. The traces 114a, 114b, 114c and pads 112a, 112b, 112c can be formed by any method commonly used in the art, such as a physical etching method or a sputter etching method.

The sensor circuit 110 can be further comprised of hardware entities. The hardware entities can be affixed to the probe portion of the flexible wiring board 102. The hardware entities can also be secured directly or indirectly to a substrate 104, which will be described in great detail below. The hardware entities can be in electrical contact with the traces 114a, 114b, 114c. The hardware entities can include a sensor 122. A person skilled in the art will appreciate that the hardware entities can also include one or more filters 120 (e.g., a surface mount RF filter) depending on the type of sensor 122 employed. For example, an RF filter can be used to filter any unwanted RF from the output of sensor 122. Sensor 122 can also have at least one thermal input terminal 119. For example, the thermal input terminal can be a grounded terminal intended to allow thermal energy to be conducted into the sensor 122.

Any suitable temperature sensing device can be used with the present invention. For example, a thermocouple or a thermistor type sensor can be used. Advantageously, the sensor 122 can also be a surface mount device integrated circuit (IC) temperature sensor. An IC temperature sensor can be designed such that it is comprised of a plurality of input and output terminals. The sensor circuit 110 can be comprised of one or more traces 114a, 114b, 114c and one or more pads 112a, 112b, 112c in accordance with the package design or pin-outs of the IC temperature sensor 122. For example, the sensor circuit 110 can be comprised of a trace 114a for electrically connecting the positive terminal of sensor 122 to a positive terminal of a power source. The sensor circuit 110 can be further comprised of a trace 114b for electrically connecting the negative terminal of sensor 122 to a negative terminal of a power source. The sensor circuit 110 can also be comprised of a trace 114c for electrically connecting the ground terminal of sensor 122 to a ground terminal of a power source. Still, a person skilled in the art will appreciate that the invention is not limited in this regard. A surface mount sensor can be selected of a type in accordance with a flex circuit sensor assembly application. The sensor circuit 110 can comprise one or more traces and one or more pads in accordance with the sensor design.

The temperature sensing system 100 can further include a substrate 104. The substrate 104 can be advantageously formed of a material that has a greater degree of rigidity as compared to the flexible wiring board 102. The substrate 104 can be made of a rigid or a semi-rigid dielectric material (for example, a polyimide or an epoxy glass). Still, the invention is not limited in this regard and any other suitable stiffening material can also be used for this purpose.

The substrate 104 can be secured to the flexible wiring board by any method commonly used in the art. For example, substrate 104 can be bonded to the flexible wiring board 102 by a pressure sensitive adhesive, a thermal set adhesive, or any other type of adhesive. Mechanical fasteners can also be used to secure the flexible wiring board to the substrate 104. In general, this substrate 104 can be useful for stiffening the flexible wiring board. Such stiffening can be advantageous for achieving greater reliability of the flexible wiring board and associated circuitry. According to one aspect of the invention, the substrate 104 can include a bore 106. The bore 106 can be selected with a size and a shape for receiving a portion of a mounting stud (e.g., a screw, a bolt, or a rail) of a flange mounted device.

The temperature sensing system 100 can further include a thermal pad 116 formed of a thermally conductive material. The thermally conductive material can be a metal, a metal alloy, a polymer material or any other type of material capable of efficiently conducting thermal energy. The thermal pad can be formed as planar disc or a tape-like element of any suitable shape or size, having a thermal contact surface 117. The thermal contact surface 117 can have a compact size and shape suitable for direct physical contact with a portion of the flange mounted device. Consequently, thermal energy can be communicated directly from a portion of the flange mounted device to the thermal contact surface 117. The thermally conductive material forming the thermal pad 116 can also be in direct contact with the sensor 122 such that thermal energy can be communicated from the thermal contact surface 117 to the sensor 122. Further, the thermally conductive material can have a bore 118. The bore 118 can have a size and shape for receiving a portion of a mounting stud of a flange mounted device. In this regard the bore 118 can be aligned with bore 106. According to one aspect of the invention, a thermal input terminal 119 of the sensor 122 can be directly connected to the thermal pad 116. For example, the thermal input terminal 119 can be connected directly to the thermal contact surface 117. This connection can be formed by any of a variety of well known techniques. For example, soldering, wire bonding, and adhesives can be used.

According to an embodiment of the invention, the thermal pad 116 can be disposed on the substrate 104. For example, the thermal pad can be affixed to the substrate 104 using a pressure sensitive adhesive. Alternatively, the thermal pad can be comprised of a copper cladding material disposed on a surface of the substrate 104. The copper cladding material can be etched or otherwise shaped and sized as appropriate to provide a good thermal connection with a flange mounted device. Still, those skilled in the art will appreciate that the invention is not limited in this regard.

FIG. 3 shows one example of an arrangement for securing the temperature sensing system 100 to a device 302 for which temperature is to be measured. In the embodiment shown, the device 302 is a flange mounted device. Moreover, the temperature sensing system is secured to the device 302 using a mounting stud 200 of the flange mounted device. In FIG. 3, the device 302 is a flange mounted transistor intended for mounting on a printed wiring board 301. However, those skilled in the art will appreciate that the invention is not limited in this regard.

As shown in FIG. 3, a mounting stud 200 can be inserted through the bores 106, 118. The mounting stud 200 can also be passed through a bore 303 that is formed in a flange 304 of the device 302. The mounting stud 200 can also be passed through a bore 305 formed in the printed wiring board 301. The temperature sensing system 100 can be secured to the mounting stud 200 using a washer 202 and/or a threaded nut 204. The nut 204 can be threaded onto the mounting stud 200. The washer 202 and nut 204 can be any type commonly used in the art for mounting a flanged device. Still those skilled in the art will appreciate that the invention is not limited to the particular mounting arrangement shown. Any other suitable method can be used for securing the thermal contact surface 117 to the device whose temperature is to be measured. For example, an adhesive material could be used to secure the thermal pad 116 to the device 302. Such adhesive can be used as an alternative, or in addition to the stud mounting system shown. Moreover, the stud mounting system can include any type of suitable mechanical fastener. If an adhesive is used, the adhesive can advantageously be selected to be a thermally conductive adhesive.

Regardless of the precise manner in which the temperature sensing system 100 is secured to the flanged device 302, the foregoing arrangement can be highly advantageous for providing a very direct thermal path between the device 302 and the sensor 122. By coupling the device 300 to the temperature sensing system 100 in the manner shown, the temperature of the flange 304 can be measured by the sensor 122. Notably, this system can provide a nearly direct thermal connection between the sensor 122 and the device whose temperature is being measured. Such a highly direct thermal connection can be advantageous for taking an accurate temperature measurement of the flange 304. For example, this system can provide a direct contact between the thermally conductive material forming the thermal pad 116 and the flange 304. Such a direct contact can allow thermal energy to be communicated quickly and directly from the flange 304 to the thermally conductive material. As a result, an improved time delay in acquiring a temperature measurement of the flange 304 is provided. In this way, rapid temperature variations can be identified more quickly. The direct thermal contact can also facilitate a more accurate temperature measurement.

Figure 4:
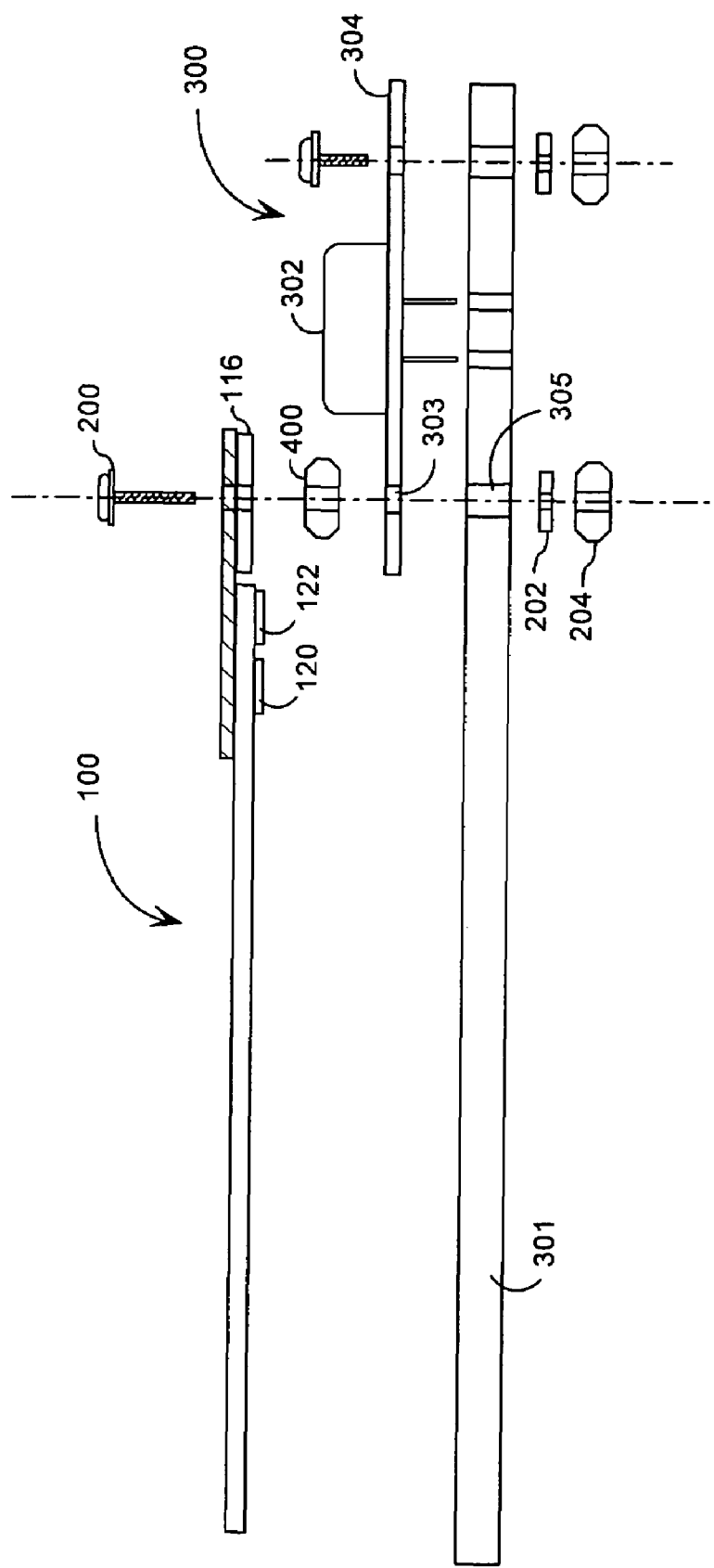
FIG. 4 is an illustration of an architecture for securing a flange mounted device to the temperature sensing system of FIG. 1 and FIG. 2.

FIG. 4 is an illustration of an alternative arrangement for securing a temperature sensing system 100 to a flange mounted device. In FIG. 4, device 302 can be coupled to the temperature sensing system 100 with spacer 400 and stud 200. The spacer 400 can be placed between the flange 304 and the thermal contact surface 117. Notably, this architecture can provide a suitable mechanical connection for taking an accurate temperature measurement of the flange 304. For example, this architecture can provide a highly direct contact between the flange 304 and the spacer 400. Such a highly direct contact can allow thermal energy to be rapidly communicated to the sensor 122 from the flange 304 and the spacer 400. A direct contact between the thermally conductive material 117 forming thermal pad 117 and the spacer 400 can also be provided. Such a direct contact can allow thermal energy to be communicated from the spacer 400 directly to the thermally conductive material forming the thermal pad. As a result, an improved accuracy and a reduced delay can be achieved when measuring temperature variations of the flange 304.

A person skilled in the art will appreciate that the architectures of FIG. 3 and FIG. 4 are embodiments of coupling architectures for securing a device 302 to a temperature sensing system 100. Any other coupling architecture for securing a flange mounted device to a temperature sensing system can be used without limitation.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A temperature sensing system for a flange mounted transistor device, comprising:
    a flexible wiring board having an elongated length;
    an electrical connector portion disposed at a first end of said elongated length configured for engagement with a mating connector;
    a temperature sensing device mounted to said flexible wiring board at a second end of said flexible wiring board opposed from said first end, said temperature sensing device including at least one thermal input terminal;
    at least one conductive trace disposed on said flexible wiring board configured for communicating electrical signals from said temperature sensing device to said electrical connector portion;
    a substrate secured to said second end of said flexible wiring board, said substrate formed of a rigid or semi-rigid dielectric material having a greater degree of rigidity as compared to said flexible wiring board, said substrate including a planar portion extending beyond said second end;
    a thermal pad disposed on said planar portion of said substrate extending beyond said second end and extending to said thermal input terminal of said temperature sensing device,
    said thermal pad formed of a thermal conductor and having an exposed thermal contact surface, said exposed thermal contact surface sized and shaped for direct physical contact with a portion of said flange mounted transistor device, and directly connected to said thermal input terminal, whereby thermal energy is communicated directly from said thermal pad to said temperature sensing device.

2. The temperature sensing system according to claim 1, wherein said thermal pad further comprises at least one bore sized and shaped for receiving a portion of a mounting stud of said flange mounted transistor device.

3. The temperature sensing system according to claim 1, further comprising an RF filter circuit disposed on said flexible wiring board.

4. The temperature sensing system according to claim 1, wherein said temperature sensing device is an integrated circuit temperature sensor.

5. A method for sensing a temperature of a flange mounted transistor device, comprising:
    inserting a mounting stud for said flange mounted transistor device in a bore formed in a thermal pad;
    mechanically securing said thermal pad on said mounting stud in contact with a flange of said flange mounted electronic device;
    communicating thermal energy from said flange to an exposed thermal contact surface of said thermal pad;
    sensing a temperature of said flange mounted device by using said thermal pad to couple said thermal energy from said flange to a temperature sensing device directly connected to said thermal pad; and
    communicating an electronic signal along an elongated length of a flexible wiring board from said temperature sensing device at a first end of said flexible wiring board, to an electronic connector portion disposed on a second opposing end of said flexible wiring board.

6. The method according to claim 5, further comprising communicating thermal energy from said flange to said thermal pad exclusive of any intervening structure.

7. The method according to claim 5, further comprising communicating thermal energy from said flange to said thermal pad exclusively through a mounting stud for said flange mounted device and a spacer element used to offset said thermal pad on said mounting stud from said flange mounted device.

8. The method according to claim 5, further comprising selecting said temperature sensing device to include an integrated circuit temperature sensing device.

9. The method according to claim 5, further comprising filtering an output of said temperature sensing device using a filter circuit disposed on said flexible wiring board.

10. The method according to claim 5, further comprising selecting a size and shape of said thermal pad to permit direct physical contact of said thermal pad with a portion of said flange.

* * * * *